United States Patent [19]
Pust

[11] Patent Number: 5,375,367
[45] Date of Patent: Dec. 27, 1994

[54] MOUSETRAP WITH DEEP BAIT RECEPTACLE

[76] Inventor: Waldo H. Pust, R.R. 2, Box 87, Savage, Mont. 59262

[21] Appl. No.: 104,349
[22] Filed: Aug. 9, 1993

Related U.S. Application Data

[63] Continuation-in-part of Ser. No. 985,366, Dec. 3, 1992, abandoned, which is a continuation of Ser. No. 681,720, Apr. 8, 1991, abandoned.

[51] Int. Cl.⁵ .......................................... A01M 23/30
[52] U.S. Cl. .................................................. 43/81
[58] Field of Search .................. 43/81, 81.5, 83.5, 82, 43/83

[56] References Cited

U.S. PATENT DOCUMENTS

| 465,418 | 12/1891 | Trumble | 43/81 |
|---|---|---|---|
| 2,574,322 | 11/1951 | Fitzsimons | 43/81 |
| 2,793,465 | 5/1957 | Tramel | 43/81 |
| 4,127,958 | 12/1978 | Peters et al. | 43/61 |
| 4,245,423 | 1/1981 | Souza et al. | 43/81 |
| 4,425,732 | 1/1984 | Kania | 43/81 |
| 4,578,893 | 4/1986 | Wickenberg | 43/77 |
| 4,703,583 | 11/1987 | Dzurkovich et al. | 43/82 |
| 4,711,049 | 12/1987 | Kness | 43/81 |
| 4,719,718 | 1/1988 | Kon | 43/81 |
| 4,779,374 | 10/1988 | Feldman | 43/81 |

FOREIGN PATENT DOCUMENTS

| 236011 | 10/1961 | Australia | 38/7 |
|---|---|---|---|
| 267099 | 12/1964 | Australia | 38/7 |
| 1101671 | 5/1981 | Canada . | |
| 3819956 | 12/1989 | Germany . | |
| 383051 | 11/1932 | United Kingdom | 43/82 |
| 630906 | 10/1949 | United Kingdom . | |
| 664144 | 1/1952 | United Kingdom . | |
| 1000538 | 8/1965 | United Kingdom | 43/81 |

Primary Examiner—Kurt C. Rowan
Attorney, Agent, or Firm—Palmatier, Sjoquist & Helget

[57] ABSTRACT

A mousetrap with a catch portion incorporating a platform and a cup-shaped receptacle on the platform which is spaced inwardly from the edges of the platform to require the mouse to stand on the platform in order to retrieve the bait from the cup-shaped receptacle. When the mouse stands on the platform, it will be tilted as to release and spring the trap.

7 Claims, 1 Drawing Sheet

MOUSETRAP WITH DEEP BAIT RECEPTACLE

This is a continuation-in-part of co-owned U.S. application Ser. No. 07/985,366 filed on Dec. 3, 1992, which is a continuation of U.S. application Ser. No. 07/681,720 filed on Apr. 8, 1991, both now abandoned.

BACKGROUND OF THE INVENTION

This invention relates to a mousetrap, and more particularly to an improved baitable catch operable to spring the trap.

Mice seem to have an incredible capability of stealing the bait out of a trap without being caught.

Many traps have a catch and bait bar which simply has a hole in it for the bait; and the mice seem to have an ability to clean out the bait from the hole with impunity. Sometimes, a quantity of bait may be tied to the bait bar, only to have the bait stolen, leaving the bait bar and catch in set position and without catching the mouse.

SUMMARY OF THE INVENTION

An object of the invention is to provide a mousetrap which minimizes the possibility of a mouse stealing the bait without springing the trap.

Another object of the invention is to provide a mousetrap requiring the mouse to do more than simply standing on the wooden frame panel and mouthing the bait in order to take the bait from the trap, thereby making it harder for the mouse and more likely that the mouse will spring the trap.

A feature of the present invention is the provision of a movable catch having a platform broader than the wooden frame panel therebelow with a bait receptacle spaced from the edges of the platform and requiring the mouse to stand on the platform and not the frame below with his front feet in order to get close enough to the bait in the receptacle. The mouse, standing upon the platform, will spring the trap and cause the bail to swing to the strike position and capture the mouse on the platform quicker than striking the frame therebelow.

DETAILED SPECIFICATION

Figure 1:
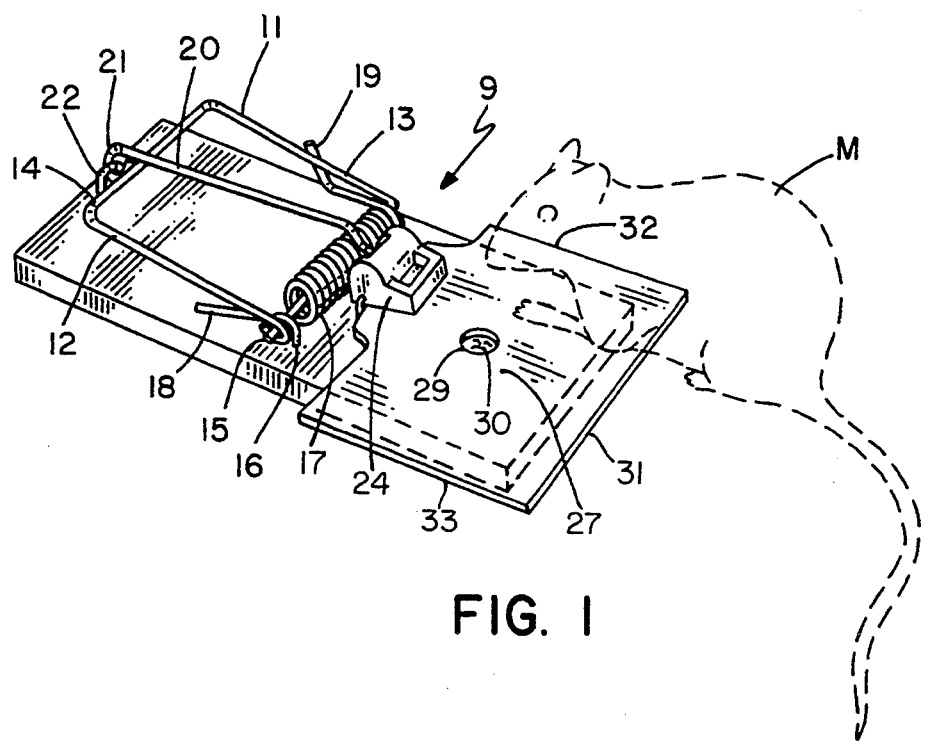
FIG. 1 is a perspective view of the improved trap.

One form of the invention is illustrated and described herein and is indicated in general by numeral 9. The trap 9 has a rigid frame panel 10, which will preferably be formed of wood.

The trap includes a substantially rigid bail 11 comprising a length of rigid or stiff wire. The bail 11 has side strike portions 12 and 13 formed integrally of the outer strike portion 14 and a mounting or pivot portion 15 which is secured to and held onto the wooden frame or base 10 by a pair of staples 16.

A coil spring 17 receives the pivot portion 15 of bail 11 therethrough; and the spring 17 has an outwardly projecting end portion 18 lying on the frame 10.

Figure 2:
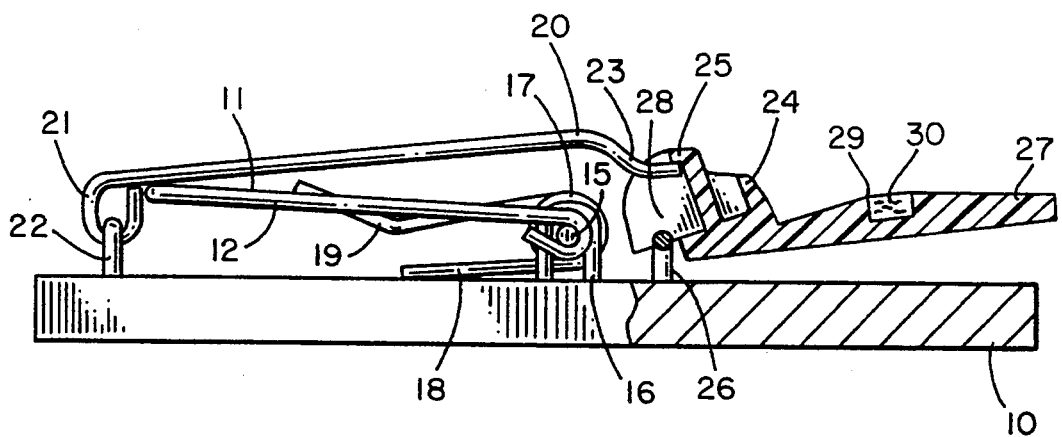
FIG. 2 is a side elevation view with portions thereof shown in section for clarity of detail.
Figure 3:
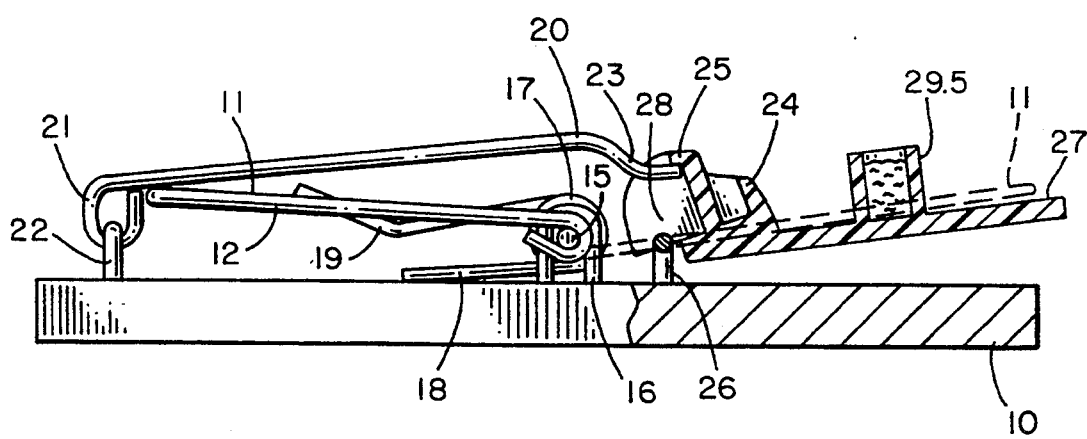
FIG. 3 is a perspective view of the improved trap with the broad platform modified.

Another swinging end portion 19 of the spring 17 is hooked under the side portion 13 of the bail 11 as to swing the bail under the influence of the spring from the set position illustrated in FIG. 1 to the strike position indicated in dotted lines and also indicated by the letter S in FIG. 2.

The trap 9 also has a keeper wire 20 with a loop 21 formed in one end thereof and attached to a mounting staple 22 which is anchored in the wooden frame 10. The keeper 20 is a length of rigid wire and has an offset end portion 23 which is releasably retained by the catch portion 24. The keeper 20 overlies the end portion 14 of the bail 11 so as to hold the bail in set position as illustrated in FIG. 1. When the keeper is released, it will swing upwardly and release the bail so that the bail may swing under the influence of the spring into the strike position S illustrated in FIG. 2.

The catch portion 24 has an engaging portion 25 comprised of forwardly extending, spaced apart, upstanding wall portions 24 and a connecting upper wall with an engagement surface for retaining the offset end portion 23 of the keeper 20 so as to maintain the trap in set condition. The catch portion 24 is tiltably and pivotally mounted on a wire staple 26 forming a pivot, which allows the catch portion to tilt thereon. The catch portion 24 also comprises a broad platform portion 27 formed by a panel preferably formed of molded plastic integrally with pivot ears 28 receiving the pivot 26, and also integrally with the engaging element 25 which retains the keeper. The platform portion 27 lies generally horizontally, though it can be slightly tilted, adjacent the frame 10 and is of such a size that its edge portions 31, 32 and 33 extend beyond the platform 27 (suitably $\frac{1}{4}''$) so that it will be struck by the bail 20 when the bail swings into the strike position so that the bail will impact against the platform 27 where the mouse is stepping on.

The catch portion 24 also includes a bait receptacle portion 29 which is formed integrally of the platform portion 27. The receptacle portion 29 has an open interior 30 into which bait for the mouse M may be placed. The interior of the receptacle portion 29 is preferably at least as deep as the interior is wide, and preferably the interior 30 is deeper than its width so as to make it difficult for the mouse to retrieve bait from the bottom of the interior. It is important that the receptacle portion 29 be spaced from all of the edge portions 31, 32 and 33 of the platform portion 27, again so as to locate the receptacle portion in such a position that the mouse will have a difficult time simply standing on the floor or standing on the frame 10 to retrieve the bait from the receptacle; but in most cases, the mouse M will have to put his front feet on the platform portion 27 in order to reach into the receptacle 29 and retrieve some bait from the interior.

When the mouse does place his front feet on the platform portion, the platform will tilt so that the engaging portion 25 will release from the keeper 20 which releases the bail 11 causing the bail to strike the mouse as its nose is in the receptacle.

It will be recognized that the spacing between the edges 31, 32 and 33 of the platform and the receptacle portion 29 should be substantial and it is preferred that the spacing between the cup and these edge portions be at least as great as the width of the cup at its exterior.

Alternatively, platform 27 may have a chimney or cup-shaped receptacle 29.5 which ideally may be of a height of approximately $\frac{1}{2}''$ to $\frac{3}{4}''$. The arrangement further assures that mouse M must step on platform 27 to place its nose and mouth into the cup-shaped receptacle.

It will be seen that I have provided a new and improved mousetrap which improves the likelihood of catching mice by making it more difficult for the mouse to steal the bait without springing the trap. The catch has a platform portion on which the mouse must stand in order to be in a position to get his nose down into the receptacle as he is seeking the bait.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A mousetrap comprising
 a frame,
 a spring operated bail swingably mounted on the frame to swing from a set position to a strike position,
 a keeper on the frame and releasably retaining the bail in set position,
 a baitable catch with a forwardly extending pair of laterally spaced upstanding walls pivotally mounted on the frame and a connecting upper wall having an underside face which forms an engagement surface for releasably holding the keeper,
 a broad, substantially square platform integrally formed with and extending rearwardly from the walls having side and rear edge portions extending beyond the frame approximately one-quarter inch thereby requiring the mouse to step on the platform and not the frame,
 and an upstanding cup-shaped receptacle centrally located on the platform, the receptacle being spaced from the side and end edge portions to necessitate that the mouse places feet on the platform portion beyond the edge portions as he reaches for the bait to spring the trap and cause the bail to strike the platform where the mouse is.

2. A mousetrap according to claim 1 wherein the strike portion of the bail is adjacent the platform edge portions.

3. A mousetrap according to claim 1 wherein the receptacle is cup-shaped of a height between $\frac{1}{2}''$ and $\frac{3}{4}''$.

4. A mousetrap according to claim 1 wherein the receptacle is stationary with the platform.

5. A mousetrap according to claim 1 wherein the receptacle comprises an interior with a depth at least as great as the width of the interior.

6. A mousetrap according to claim 1 wherein the receptacle comprises an interior with a depth and width, the depth being greater than the width.

7. A mousetrap comprising
 a frame,
 a spring-operated bail swingably mounted on the frame to swing from a set position to a strike position,
 a keeper releasably retaining the bail in the set position,
 a catch for releasably holding the keeper,
 a broad, substantially square platform integrally formed with and extending rearwardly from the catch and the keeper having side and rear edge portions extending beyond the frame approximating one-quarter inch thereby requiring the mouse to step on the platform and not the frame, the strike portion of the bail being adjacent the platform edge portions,
 and a raised cup-shaped receptacle centrally located on the platform, the receptacle being spaced from the side and rear edge portions to necessitate that the mouse place his feet on the platform portion beyond the edge portions as he reaches for the bait to spring the trap and cause the bail to strike the platform where the mouse is.

* * * * *